US011023837B2

(12) United States Patent
Furu et al.

(10) Patent No.: US 11,023,837 B2
(45) Date of Patent: Jun. 1, 2021

(54) METHOD FOR THE OPTIMISATION OF PRODUCT PROPERTIES AND PRODUCTION COSTS OF INDUSTRIAL PROCESSES

(71) Applicant: NORSK HYDRO ASA, Oslo (NO)

(72) Inventors: Trond Furu, Sunndalsora (NO); Ole Runar Myhr, Raufoss (NO)

(73) Assignee: NORSK HYDRO ASA, Oslo (NO)

( * ) Notice: Subject to any disclaimer, the term of this patent is extended or adjusted under 35 U.S.C. 154(b) by 881 days.

(21) Appl. No.: 14/412,029

(22) PCT Filed: Jul. 1, 2013

(86) PCT No.: PCT/NO2013/000026
§ 371 (c)(1),
(2) Date: Dec. 30, 2014

(87) PCT Pub. No.: WO2014/007641
PCT Pub. Date: Jan. 9, 2014

(65) Prior Publication Data
US 2015/0178656 A1    Jun. 25, 2015

(30) Foreign Application Priority Data
Jul. 4, 2012 (NO) .................................. 20120779

(51) Int. Cl.
*G06Q 10/06* (2012.01)
*G06Q 10/04* (2012.01)

(52) U.S. Cl.
CPC ....... *G06Q 10/06316* (2013.01); *G06Q 10/04* (2013.01); *G06Q 10/0631* (2013.01); *Y02P 90/80* (2015.11)

(58) Field of Classification Search
CPC .......................................... G06Q 10/00–90/00
See application file for complete search history.

(56) References Cited

U.S. PATENT DOCUMENTS 6,810,291 B2  10/2004 Card et al.
6,934,931 B2   8/2005 Plumer et al.
(Continued)

FOREIGN PATENT DOCUMENTS

CN    101807265    8/2010
CN    102289743   12/2011
(Continued)

OTHER PUBLICATIONS

Fung, R. Y. K., An intelligent hybrid system for customer requirements analysis and product attribute targets determination, International Journal of Production Research. Jan. 1998, vol. 36 Issue 1, p. 13-34. 22p. (Year: 1998).*
(Continued)

*Primary Examiner* — Arif Ullah
(74) *Attorney, Agent, or Firm* — Wenderoth, Lind & Ponack, L.L.P.

(57) ABSTRACT

A method for optimisation of product properties and production costs of industrial processes where a product is manufactured in several operations, Including the following steps: —establishing process chain models (1-m) for each process (1-n), altogether (m×n) models for the calculation of product properties and product production costs, —defining model inputs and outputs related to each of the (m×n) models for physical, chemical or biological parameters and costs of the product, —defining limitations or minimum requirements related to each of the (m×n) models of product properties or process capacity or ability, —providing an optimizing tool linked to the input and output steps and model limitations performing iterations and flow of data between said steps to optimize the product based on customer requirements.

7 Claims, 7 Drawing Sheets

(56) References Cited

U.S. PATENT DOCUMENTS

| | | | |
|---|---|---|---|
| 2001/0049595 A1 | 12/2001 | Plumer et al. | |
| 2003/0046130 A1* | 3/2003 | Golightly | G06Q 10/04 705/7.24 |
| 2003/0050765 A1 | 3/2003 | Sasahara | |
| 2003/0083757 A1 | 5/2003 | Card et al. | |
| 2008/0255892 A1 | 10/2008 | Orangi et al. | |
| 2009/0204267 A1 | 8/2009 | Sustaeta et al. | |
| 2012/0232685 A1* | 9/2012 | Wang | B22D 46/00 700/98 |

FOREIGN PATENT DOCUMENTS

| | | |
|---|---|---|
| CN | 102463268 | 5/2012 |
| WO | 01/77872 | 10/2001 |
| WO | 03/019448 | 3/2003 |
| WO | 03/025685 | 3/2003 |
| WO | 2012/048808 | 4/2012 |

OTHER PUBLICATIONS

International Search Report dated Oct. 3, 2013 in International Application No. PCT/NO2013/000026.
Chinese Office Action dated Nov. 28, 2016 in Chinese Patent Application No. 201380035562.3 with Search Report.

* cited by examiner

METHOD FOR THE OPTIMISATION OF PRODUCT PROPERTIES AND PRODUCTION COSTS OF INDUSTRIAL PROCESSES

BACKGROUND OF THE INVENTION

Technical Field

The present invention relates to a method for optimisation of product properties and production costs of industrial processes where a product is manufactured in several operations which include a process chain.

The best product, from a commercial point of view, is a product which satisfies the customer requirements at a lowest possible cost. This usually implies a trade-off between a plurality of factors. It is not the same as optimizing a certain process or an intermediate product along the process chain, or even to optimize the end product with respect to properties. The only possibility of performing a "true" optimisation according to the definition above is to account for the complete production chain involving all the major processes and at the same time all possible parameters affecting the costs. This requires, however, that all such models are available, which restricts the applications of the concept significantly, since only a few companies possess all the competence required to be able to develop such methodology.

Background Art

The most common approach related to optimisation of industrial manufacturing processes or industrial products is as indicated above to make improvements to the production processes on a limited scale or step, or to make modifications to the product based on redesign or re-selection of materials, i.e. so-called sub-optimisation solutions. The prior art shows a number of examples related to such optimisation solutions. Thus, WO 2012/048808 A1 shows a method for determining an optimal production schedule based on predetermined cost functions and predetermined production process models enabling determination of a total cost variable and thereby selection of the optimal production schedule of which the total cost variable is the lowest. This known method includes cost factors such as energy and material costs in addition to production process models, but fails to include other parameters and models such as physical properties of the product and design models related to the product etc.

Further US 2003/0050765 A1 relates to a system for aiding optimization of a die assembly shape to manufacture a predetermined plastic work piece by using a computer. Again, this is a process for sub-optimisation since it is concerned with improvement of the design or shape as such and does not encounter the optimisation of all physical parameters or costs.

BRIEF SUMMARY OF THE INVENTION

With the present invention is provided a new and novel method for optimisation of product properties and production costs of industrial processes where a product is manufactured in several operations which comprises a total "process chain." The main features of the invention can be summarized as follows:

The complete process chain, or the part of the process chain which is deemed to be the most significant, is represented by predictive models.

The material and processing costs are predicted by specially dedicated models.

An optimisation tool is used to seek the best combination of raw material sources and processing parameters to satisfy user defined acceptance levels on properties according to customer requirements, at a lowest possible cost.

The invention is versatile and generally applicable for different processes and products. For example in production of aluminium components, many of the models as well as the solution algorithm will be the same for different products, e.g. products based on extrusion, rolling or shape casting. Hence, the basic software tool can be the same for all these processes, if specific process dependent sub-routines or models are substituted where they are needed.

It is not formerly known using the combination of features described in the present application, i.e. "Through Process Modelling" in combination with cost models and an optimisation routine as stated above. Hence, the main idea behind the present concept is to avoid "sub-optimisation", which is very often the result if one tries to optimize a process or a product without considering the complete process chain and the costs of materials and processing including logistics and material flow.

The invention is characterized by the feature as defined below.

Preferred embodiments of the invention is characterized by the features as defined below.

BRIEF DESCRIPTION OF THE DRAWINGS

The present invention will be described in further detail in the following by way of examples and with reference to the drawings, where.

DETAILED DESCRIPTION OF THE INVENTION

Figure 1:
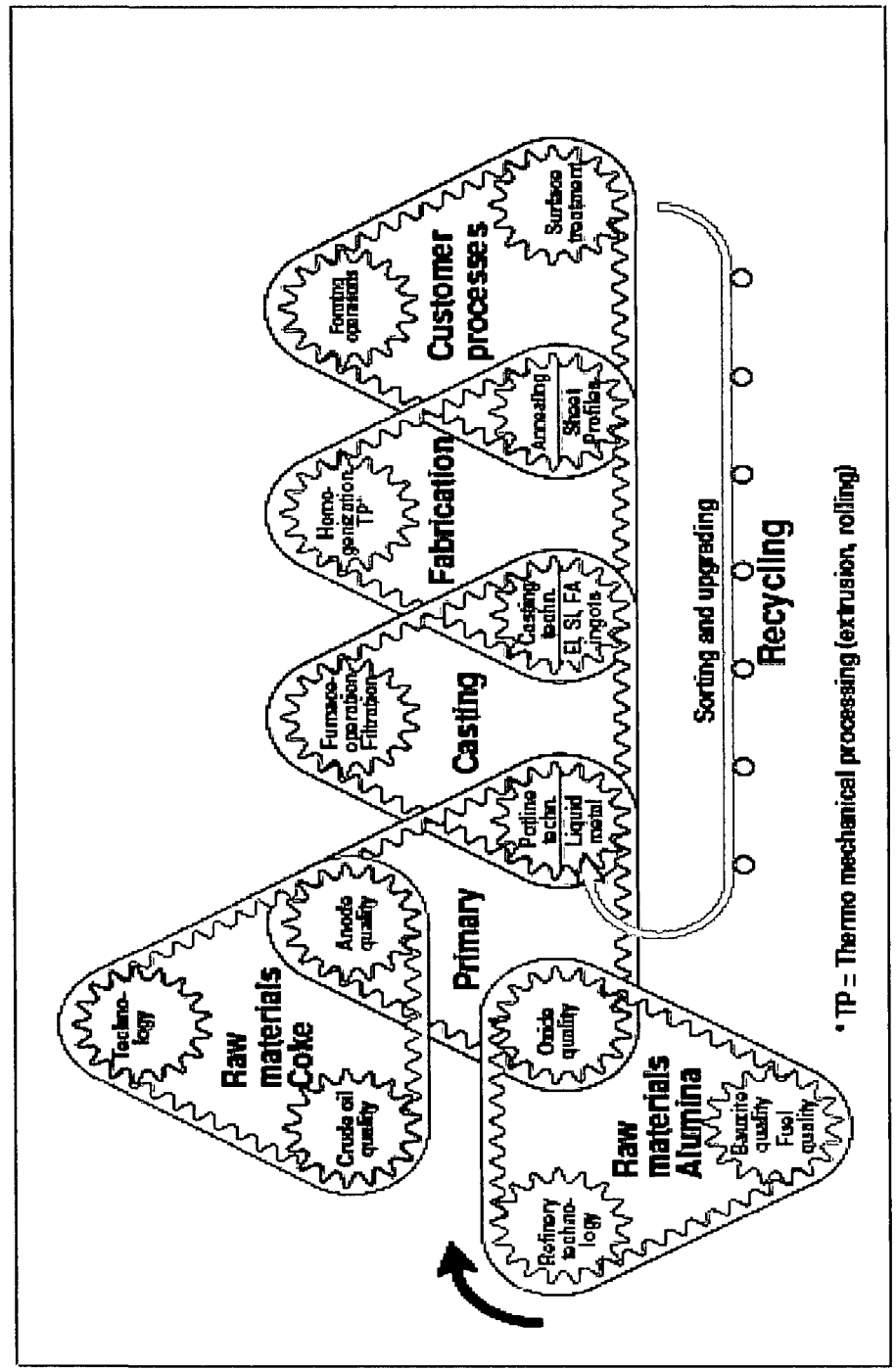
FIG. 1 Shows a process chain illustrating how different processes and operations are integrated, FIG. 2 Is a flow chart showing the method steps according to the invention.

The starting point of the present invention is a process chain illustrating how different processes and operations are integrated in order to fabricate certain products as shown in FIG. 1. The process chain shown in this figure illustrates how aluminium based products are commonly manufactured.

Figure 2:
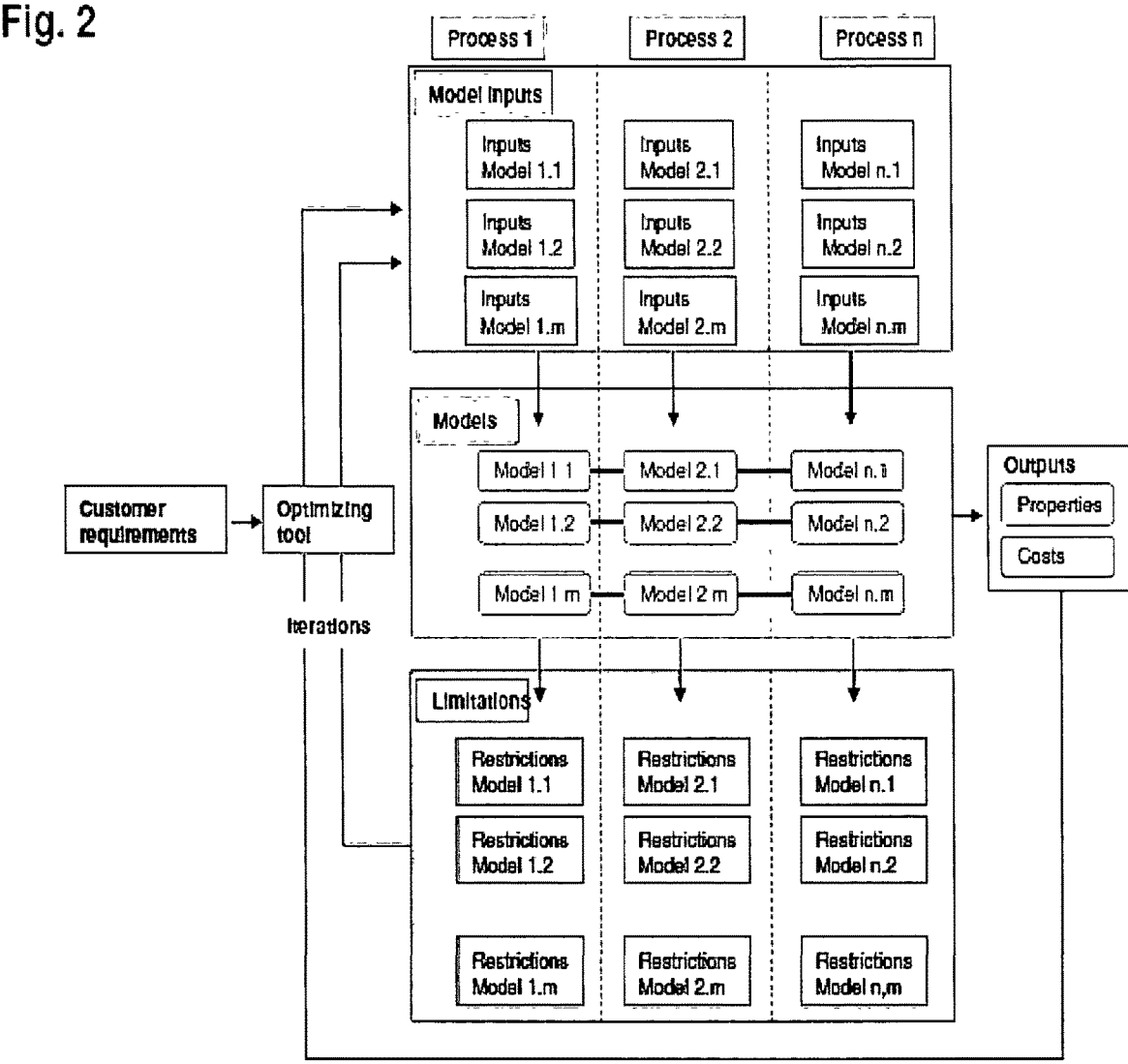

This process chain is the basis for the construction of the flow chart as shown in FIG. 2 where the first "step" of the invention is to represent the processes and production operations by models, as is indicated by the denotation "Model" in the figure (i.e. Model 1.1, 1.2, . . . n.m).

The second "step" of the invention is to define the inputs and outputs, as is indicated in the boxes denoted respectively "Model inputs" and "Outputs" in the figure.

Finally, limitations, which leads to unacceptable product quality (i.e. scrap), or which restricts the production rate, must be defined. This is indicated by the denotation "Limitations" in the lowermost box of the figure, i. e "Restrictions 1.1, 1.2 . . . n,m). It should be noted that the term "limitations" can be related to both the process and the product. Process related limitations include for instance maximum power or force that the equipment can deliver in certain processes like extrusion and rolling, which restricts the maximum possible extrusion or rolling speed. It can also be limitations of the heating or cooling equipment, which, in turn yield corresponding restrictions on the maximum heating or cooling rate of the product. Limitations may also include the time the production equipment is unavailable for some reasons like for instance planned maintenance or vacations for the operators of the equipment. If there exist statistical data for typical "downtimes" of the equipment, this should be included in the limitations. Process related limitations can also be due to logistic problems, which leads to delays along the process chain, and which must also be accounted for. Product related limitations include everything that lead to a non acceptable product. For instance, a too high casting speed in Direct Chill (DC) casting may lead to hot-cracking in the centre of the ingot, and then the product can not be accepted. Another example is related to the extrusion process, where it is well known that a too high extrusion speed may give tearing at the surface, which means that the profile, or parts of the profile, must be scrapped.

Two different types of models are used which can be classified as follows:
1. "Property models", i.e. models related to calculations of some properties of the intermediate (i.e. after some operations of the process chain) or final product.
2. "Cost models" which include all types of models that are used for estimating the production costs.

Some of these models are generic and may be used for different process chains, while others are specially dedicated for a certain process or group of products. In the following, the different types of models are briefly described.

Group (1), "Property models": These types of models are used to calculate some kind of property of the intermediate or final product. The intermediate products are the products that are produced after a certain operation along the process chain. In the present invention "properties" must be interpreted in a broad sense, and include such as:
Mechanical properties like strength, ductility, fracture toughness, fatigue and creep behaviour.
Microstructure features including grain structure, particle structure including stoichiometry, atoms in solid solution, and texture.
Atomistic type of models including models derived from first principles.
Surface appearance and optical properties like gloss, reflection, colour.
Corrosion properties including pitting corrosion, intergranular corrosion, stress corrosion cracking and corrosion fatigue.
Electrical and thermal conductivity.
High temperature stability of microstructure and properties.
Quench sensitivity.
Energy absorption capability including crash performance and impact properties.
Loosely defined terms like weldability, brazing ability, castability, extrudability, rollability, machinability and formability.
Properties related to heat flow, mass transfer and fluid mechanics, including thermal diffusivity and viscosity.

Figure 3:
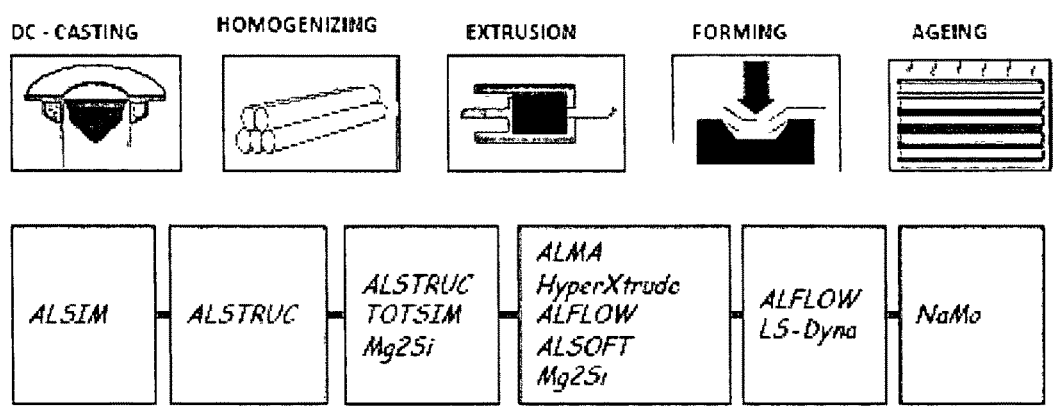
FIG. 3 shows example of "property models" used in simulation of different process steps or operations in production of extruded aluminium profiles.

The "property models" may include physically based models (e.g. metallurgical, microstructure or thermodynamic based models), empirical models based on measurements or production data as well as mechanical models like FE-codes. FIG. 3, which relates to production of aluminium extrusions, shows example of "property models" concerned with such production, i.e. physically based microstructure models and FE-models, used in simulation of different process steps or operations in production of extruded aluminium profiles. Most of the models are generic and can be used for a range of different processes and products, while a few are especially dedicated models like the softwares Alma™ and NaMo™, which are restricted to extrusion processes and age-hardening aluminium alloys, respectively. The models shown in FIG. 3 are briefly described in the following:

(i) Alsim™, is a commercial Finite Element (FE)-code for casting of metals.

(ii) Alstruc™ model is a non-commercial microstructure model for solidification and homogenisation of Aluminium alloys described in: A. L. Dons, E. K. Jensen, Y. Langsrud, E. Trømborg, and S. Brusethaug, Metallurgical and Materials Transactions, 30A, (1999).

(iii) Totsim™ is a non-commercial model for calculation of precipitation and transformation reactions in aluminium alloys described in: A. Håkonsen, D. Mortesen. S. Benum, T. Pettersen and T. Furu, TMS-Light Metals 2002, p. 793.

(iv) Mg2Si is a non-commercial model for 6xxx aluminium alloys which calculates the precipitation of non-hardening precipitates during cooling as a function of the cooling cycle, and the resulting solid solution concentrations of Mg and Si.

(v) Alma™ is a non-commercial FE-program for extrusion simulations based on a two dimensional Eulerian description as described in K. Holthe, S. Støren and L. Hanssen, Proc. NUMIFORM-92, (1992) p. 611.

(vi) Altair®'s HyperXtrude™ software is a commercial FE-code for modeling complex fluid flow and heat transfer problems.

(vii) Alflow™ is a non-commercial work-hardening model which calculates the evolution of the dislocation structure and the corresponding flow stress response during thermo-mechanical processing, as described in E. Nes, Prog. Materials Sci., 41 (1998) p. 129, and E. Nes and K. Marthinsen, Mater. Sci. Eng., A322 (2002), p. 176.

(viii) Alsoft™ is a non-commercial model that predicts the evolution in the grain structure and texture during recovery and recrystallization of hot or cold deformed materials after deformations at elevated temperatures as well as after cold deformation, as described in: T. Furu, K. Marthinsen and E. Nes, Materials Science and Technology, 6, (1990), p. 1093, and H. E. Vatne, T. Furu, R. Ørsund and E. Nes, Acta Metall. 44, (1996) p. 4463

(ix) LS-DYNA™ is a commercial general-purpose nonlinear finite element code for analyzing large deformation responses of inelastic solids and structures.

Figure 4:
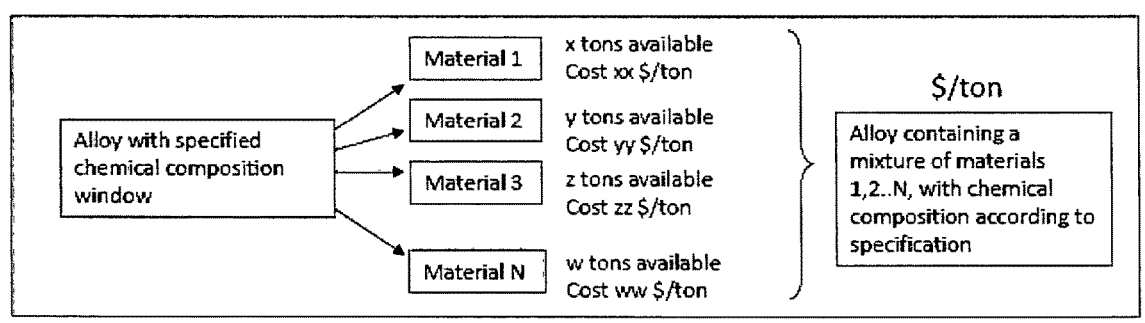
FIG. 4 illustrates example of cost models for selected material, e.g. software HalOpt™ model developed by the applicant.

(x) The NaMo™ model is a non-commercial combined precipitation, yield stress and work hardening model for 6xxx series aluminium alloys described in: O. R. Myhr, Ø. Grong, and K. O. Pedersen: A Combined Precipitation, Yield Strength and Work Hardening Model for Al—Mg—Si Alloys. Met. Trans A, Vol. 41, No. 9, 2010, pp. 2276-2289. Group (2) types of models as shown in FIG. 4, i.e. the "cost models" range from simple cost estimates for a process, where the costs are calculated directly from production parameters (e.g. parts/hour, scrap and repair rates etc.), to complex models for material costs which utilises information on raw material prices and availability of for instance scrap sources, like the applicant's (Norsk Hydro) own developed HalOpt™ model. Other types of models include logistic models which account for production equipment availability, transferring of materials and products between the different processing locations etc.

"Optimizing tool". The optimizing software tool couples the different models that are part of the process chain and organises the iterations and the flow of data between the models. The user specifies the properties which needs to be optimised, and which properties that are not important, or need to be kept within certain limits, according to "customer requirements".

There are different commercial software tools available for this purpose, for instance the commercial optimization tool "modeFrontier"™. Different types of superficial neural networks or similar types of numerical models may also be applied.

Example 1

Production of Extruded 6xxx Aluminium Alloys.

Figure 5:
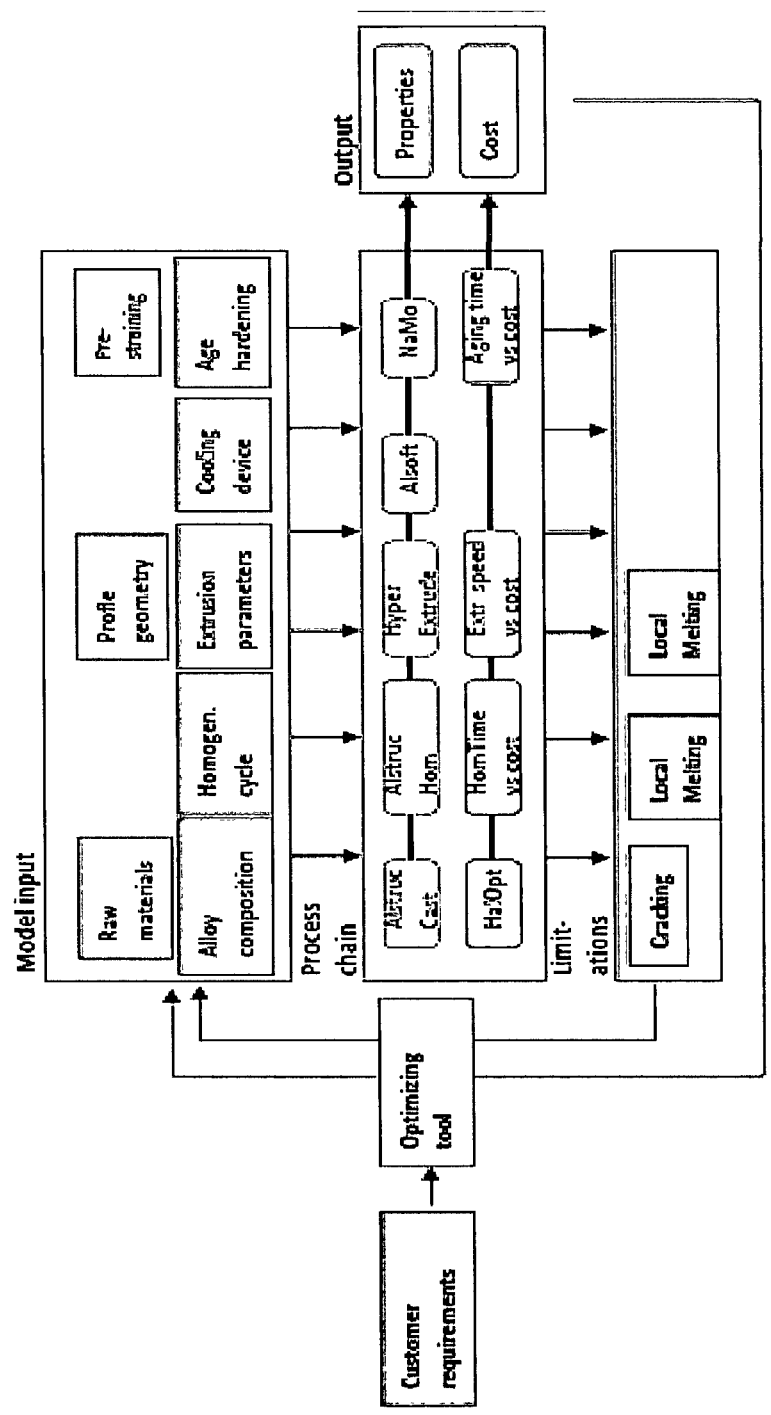
FIG. 5 is a diagram showing an example on a complete flow-chart for production of extruded 6xxx aluminium alloys.

FIG. 5 is a diagram showing an example on a complete and detailed flow-chart for production of extruded 6xxx aluminium alloys, where the individual models are identified. In the following, the principles described in the previous pages will be explained in more details for this particular process chain.

The flow-chart as shown in FIG. 5 contains the most important components needed to perform an optimization of the process chain. However, in order to avoid "overloading" of the diagram, some routines which may be needed in order to carry out reliable optimizations are not included but will be described in the following below.

Wear of equipment: For some processes, like for instance extrusion, the wear of the equipment comprises a significant contribution to the overall costs. For the extrusion die, the alloy as well as the extrusion parameters affect the life of the die, which therefore must be included in the cost calculations.

This is possible by utilising for instance the HyperXtrude™ software model developed by Altair®, which is used as a tool for making simple estimates of relations between geometry and die life, based on for instance stress distributions and concentrations.

Availability of equipment and bottlenecks: Lack of capacity in certain processes, may further restrict the utilization of a high production rate in the rest of the chain. For the present example, the homogenisation as well as the ageing furnace may represent such bottlenecks. In practice, maximum values of the production capacity of specific processes should be specified in the "Limitations" part of the flow-chart (i.e. the lowermost box of the diagram) in order to account for processes that restrict the overall "flow" or production rate.

Logistics and storing capacity must also be considered in this connection. The first step is, as stated above, to specify the customer requirements, as indicated by the upper box in the flow-chart of FIG. 5. As described previously, the customer defined "property profile" of the product may contain a large number of product requirements.

Geometry: The design of the profile may be fixed if the customer requires a specific geometry. Alternatively, the design may be optimised, which usually requires that some characteristic dimensions of the cross section are parameterized. The geometry affects a range of properties. Examples of properties that are directly related to the profile design includes the stiffness which depends on the moment of inertia as well as the axial load bearing capacity, which is proportional to the area.

Mechanical properties: Examples of customer specified mechanical are tensile properties, which may be specified as follows:

Yield stress>190 MPa
Ultimate tensile stress>215 MPa
Elongation to fracture>15%

"Weldability": This is an example of a "loosely" defined customer specification, which must be transformed to more specific requirements in order to perform an optimisation. When the customer requires that the alloy is weldable, this probably means that he expects to get sound welds with sufficient strength by the use of a standard welding method like MIG (Metal Inert Gas), TIG (Tungsten Inert Gas), Laser Welding or Friction Stir Welding (FSW) A simple requirement may then be to avoid liquation cracking in the HAZ, which implies that certain low melting point phases, must be avoided. This may in turn put restrictions on the content of certain elements like Cu, which tends to form such phases. In order to obtain sufficient strength in the weld, the Heat Affected Zone (HAZ) often represents the weak link of the joint in 6xxx alloys, and must be given due attention. Especially dedicated weld simulation models like the commercially available Weldsim™ can be used to optimise the weld properties, preferably in combination with the Hydro owned NaMo-model. This allows predictions of the load bearing capacity of the welded joint.

Figure 6:
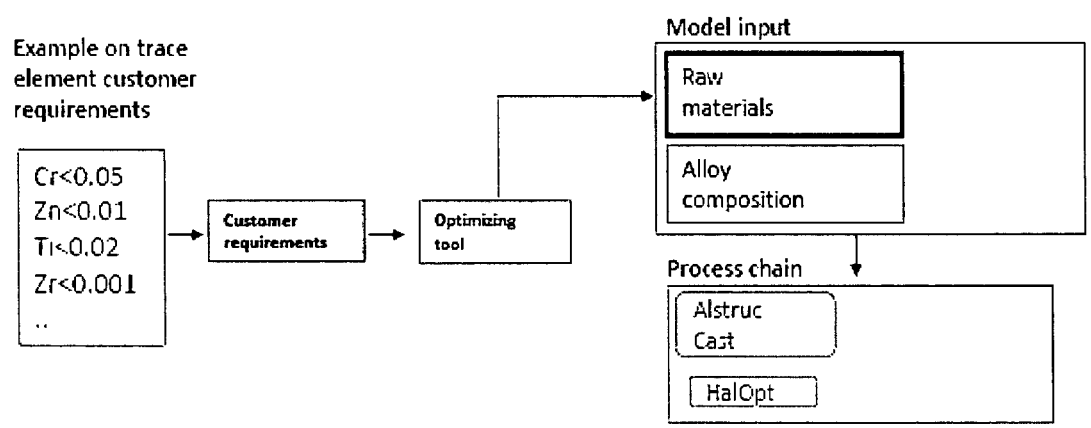
FIG. 6 shows part of the diagram relating to trace elements shown in FIG. 5.

In the following, some features regarding the cost calculations related to the selection of raw material and alloy composition, as shown in FIG. 6, is further discussed.

The customer requirements regarding trace element concentrations, as illustrated in the figure, give a significant impact on the costs of the raw materials. Trace element concentrations depend on the alumina, coke and pitch source quality. The HalOpt™ model as shown in FIG. 6 is developed by the applicant and is capable of accounting for different raw material sources, including the trace element levels, on the resulting costs of the alloy to be produced. (In this connection it should be noted that FIG. 6 is just a part of an overall flow-chart, and additional constitutions are therefore required as outlined by the general flow chart shown in FIG. 2).

Example 2

Production of Extruded 3xxx Aluminium Alloys.

Figure 7:
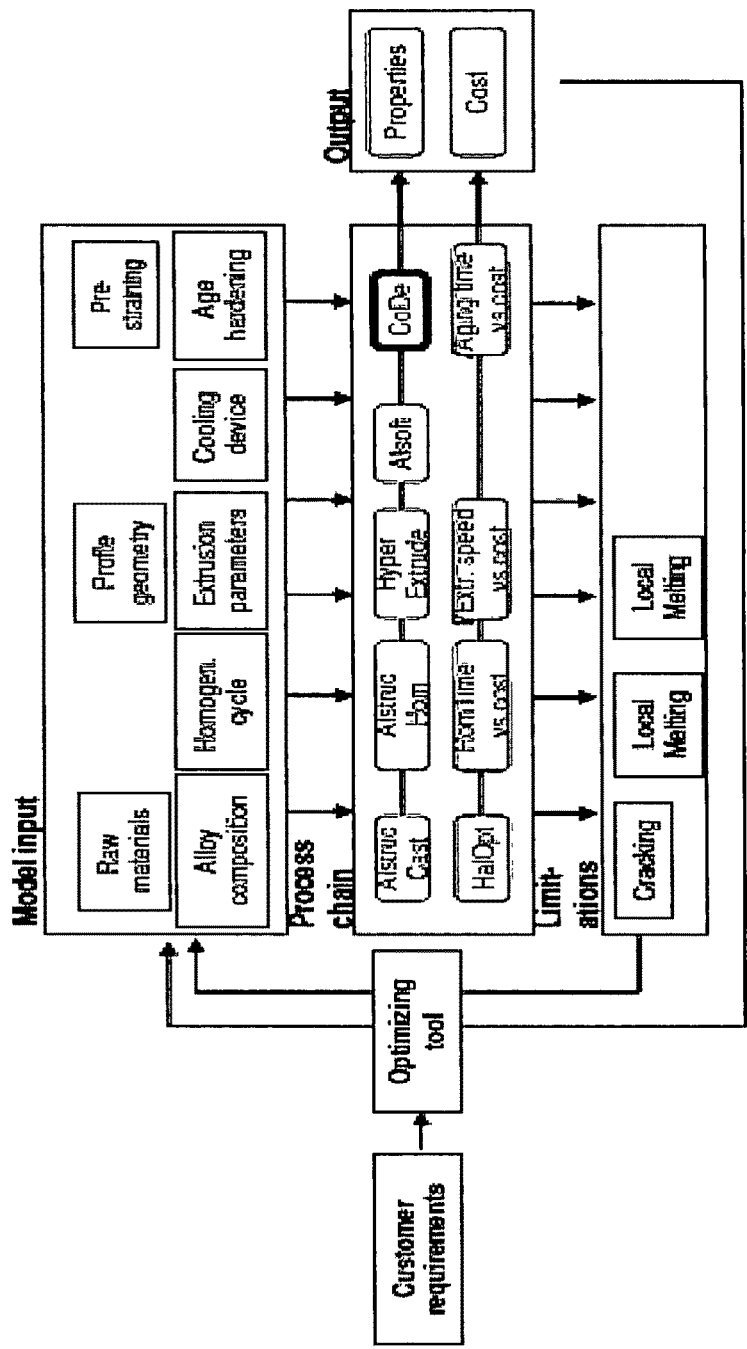
FIG. 7 is a diagram showing another example on a complete and detailed flow-chart for production of thin-walled extruded profiles of non-heat treatable aluminium alloys.

As an example on the versatility of the concept, a second example according to the invention is a process chain used for production of thin walled extruded profiles of non-heat treatable alloys. In this case, the NaMo™ software model as shown in FIG. 5 will not be relevant, but another non-commercial software, the CoDe™ software model, which calculates the corrosion susceptibility of the profile is included, since corrosion is a key issue for such products. The CoDe™ model is shown in the uppermost left box of the Model chain of the attached FIG. 7. In order to optimise the corrosion properties, certain phases, like $Al_3Fe$ should be avoided. The volume fraction and size distribution of such particles, are calculated by the Alstruc™ software model, shown in the flow chart. The solid solution concentrations of different elements are output from Alstruc™, and these are used as input to CoDe™, which calculates the evolution of these concentration profiles during heat treatment and brazing. The CoDe™ model is just an example on a type of corrosion model, and any similar commercial or non-commercial model with similar capabilities as CoDe™ can be used instead.

Other customer requirements are strength, elongation, which are estimated from the microstructure calculated by available software such as Alstruc™, as well as the grain structure, where a fully re-crystallized or fully non-recrystallized structure may be specified. This is predicted by the Alsoft™ software model, based on input from the models in the previous operations.

If the profile is part of a brazed component, this may give restrictions on the maximum Mg-concentration of the alloy.

Even though the invention as described above is directed to a method for optimisation of product properties and production costs of industrial processes, the invention as defined herein may also be used to optimise a production plant with regard to its production equipment and logistics. The method also allows for optimisation of other outputs from the models than described above, as for instance the energy consumption per product or the amount of harmful emissions per product. This can be attempted minimized provided that each separate process of the production chain contains a model that estimates the relation between production parameters and energy consumption or harmful emissions. There can also be differences in the energy consumption or emissions related to different raw material sources, which can be included in the models. In this way, the methodology can also be used for minimising the environmental impact of the production, like for instance $CO_2$ emissions per product.

Further, it is important to note that the invention as defined herein can be used to produce any industrial products including chemical or biological products. Thus, the method may include chemical and biological models as well as corresponding chemical and biological parameters.

The invention claimed is:

1. A computer-implemented method for optimization of product properties and product production costs of an industrial process where a rolled, extruded, cast, and hot or cold worked product of aluminum or an aluminum alloy is manufactured as an optimized product by production equipment in several operations which comprise a total process, the computer-implemented method comprising:
    executing, by a computer implemented optimization software tool on the production equipment, the steps of:
    establishing process chain models for each operation of the industrial process, process chain models for a calculation of the product properties of an intermediate and/or final product, and process chain models for calculations of the product production costs, the process chain models being predictive models;
    defining property model inputs and property outputs related to each of the process chain models for the calculation of the product properties of the intermediate and/or the final product;
    defining cost model inputs and cost outputs related to each of the process chain models for the calculations of the product production costs;
    defining limitations or minimum requirements, related to each of the process chain models, of the product properties or a process capacity or ability, including limitations that restrict the production rate;
    producing the optimized product which couples each of the process chain models and the limitations or minimum requirements related to each of the process chain models, and organizes iterations and flow of data between each of the process chain models to obtain a best combination of raw material sources and processing parameters to satisfy customer defined acceptance levels on properties, at a lowest possible cost; and
    performing each operation of the industrial process while applying output data from each of the process chain models as input data for each operation of the industrial process to produce the optimized product by the production equipment.

2. The computer-implemented method of claim 1, wherein property models include physically based models as well as empirical models based on measurements or production data and/or mechanical, chemical and biological models.

3. The computer-implemented method of claim 1, wherein cost models include cost estimates calculated directly from production parameters, the production parameters including parts per hours, production scrap and repair rates, and complex models for material costs utilizing information on raw material prices and availability of raw materials, the materials costs including virgin or re-cycled materials.

4. The computer-implemented method of claim 1, wherein property models and cost models are commercially available data software programs.

5. The computer-implemented method of claim 1, wherein the optimization software tool is software based on superficial neural networks or types of numerical models.

6. The computer-implemented method of claim 5, wherein the optimization software tool is commercially available software.

7. The computer-implemented method of claim 1,
    wherein performing iterations and flow of data between each of the process chain models to optimize the product based on customer requirements comprises performing a plurality of iterations and flow of data between each of the process chain models to optimize the product based on customer requirements, and
    wherein applying the output data from the process chain models as input data for each process of the industrial processes and producing the product according to the input data comprises applying output data from the process chain models as input data for each process of the industrial processes and producing the product according to the input data after performing the plurality of iterations and flow of data between each of the process chain models to optimize the product based on customer requirements is complete.

* * * * *